United States Patent
Peng et al.

(10) Patent No.: US 10,749,199 B2
(45) Date of Patent: Aug. 18, 2020

(54) $LI_{1+x}AL_xTI_{2-x}(PO_4)_3$ SOLID-STATE THIN FILM ELECTROLYTE FOR 3D MICROBATTERY AND METHOD OF FABRICATION

(71) Applicant: International Business Machines Corporation, Armonk, NY (US)

(72) Inventors: Lele Peng, Austin, TX (US); Qinghuang Lin, Yorktown Heights, NY (US); Yujun Xie, New Haven, CT (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 15/826,409

(22) Filed: Nov. 29, 2017

(65) Prior Publication Data

US 2019/0165400 A1    May 30, 2019

(51) Int. Cl.
| | | |
|---|---|---|
| *H01M 8/10* | (2016.01) | |
| *H01M 8/1016* | (2016.01) | |
| *H01M 6/18* | (2006.01) | |
| *H01M 10/0562* | (2010.01) | |
| *H01M 10/04* | (2006.01) | |

(Continued)

(52) U.S. Cl.
CPC ......... *H01M 8/1016* (2013.01); *H01M 6/187* (2013.01); *H01M 6/188* (2013.01); *H01M 10/0436* (2013.01); *H01M 10/058* (2013.01); *H01M 10/0562* (2013.01); *H01M 6/40* (2013.01); *H01M 2008/1293* (2013.01); *H01M 2220/30* (2013.01); *H01M 2300/0068* (2013.01); *H01M 2300/0094* (2013.01)

(58) Field of Classification Search
CPC ........ H01M 6/187; H01M 6/188; H01M 6/40; H01M 8/10; H01M 8/1016; H01M 8/24
USPC .......................................................... 429/495
See application file for complete search history.

(56) References Cited

U.S. PATENT DOCUMENTS

| | | |
|---|---|---|
| 6,197,450 B1 | 3/2001 | Nathan et al. |
| 6,264,709 B1 | 7/2001 | Yoon et al. |

(Continued)

FOREIGN PATENT DOCUMENTS

WO    2004012283 A2    2/2004

OTHER PUBLICATIONS

Schell et al., "Effect of calcination conditions on lithium conductivity in Li1.3Ti1 7Al0 3 (PO4)3 prepared by sol-gel route", Ionics, Published online Nov. 3, 2016, pp. 821-827, vol. 23, No. 4.

(Continued)

*Primary Examiner* — Amanda C. Walke
(74) *Attorney, Agent, or Firm* — Scully, Scott, Murphy & Presser, P.C.; L. Jeffrey Kelly, Esq.

(57) ABSTRACT

A solid-state rechargeable 3D microbattery is provided that has improved power density, energy density, and cycle lifetimes. These improvements are afforded by providing a solid-state electrolyte that is composed of crystalline $Li_{1+x}Al_xTi_{2-x}(PO_4)_3$, wherein x is from 0 to 2. The solid-state electrolyte that is composed of crystalline $Li_{1+x}Al_xTi_{2-x}(PO_4)$ has a high ionic conductivity (which is greater than $10^{-4}$ Siemens/cm) as well as high chemical stability.

11 Claims, 6 Drawing Sheets

(51) Int. Cl.
*H01M 10/058* (2010.01)
*H01M 8/124* (2016.01)
*H01M 6/40* (2006.01)

(56) References Cited

U.S. PATENT DOCUMENTS

| | | | |
|---|---|---|---|
| 6,863,699 | B1 | 3/2005 | Krasnov et al. |
| 7,144,655 | B2 | 12/2006 | Jenson et al. |
| 7,166,384 | B2 | 1/2007 | LaFollette et al. |
| 7,194,801 | B2 | 3/2007 | Jenson et al. |
| 7,211,351 | B2 | 5/2007 | Klaassen |
| 7,344,804 | B2 | 3/2008 | Klaassen |
| 7,776,478 | B2 | 8/2010 | Klaassen |
| 7,939,205 | B2 | 5/2011 | Klaassen |
| 8,197,781 | B2 | 6/2012 | Neudecker et al. |
| 8,304,115 | B1 | 11/2012 | Petkov et al. |
| 9,093,717 | B2 | 7/2015 | Sakamoto et al. |
| 9,362,528 | B2 | 6/2016 | Yan |
| 9,494,543 | B2 * | 11/2016 | Moon .................... G01N 27/18 |
| 9,580,320 | B2 * | 2/2017 | Inda ........................ C01B 25/45 |
| 9,728,807 | B2 * | 8/2017 | Birke ..................... H01G 9/025 |
| 10,164,287 | B2 * | 12/2018 | Ouchi ............... H01M 10/0562 |
| 2004/0049909 | A1 | 3/2004 | Salot et al. |
| 2005/0095506 | A1 | 5/2005 | Klaassen |
| 2008/0032236 | A1 | 2/2008 | Wallace et al. |
| 2010/0285372 | A1 | 11/2010 | Lee et al. |
| 2010/0316913 | A1 | 12/2010 | Klaassen |
| 2012/0021298 | A1 | 1/2012 | Maeda |
| 2013/0260183 | A1 * | 10/2013 | Ellis-Monaghan ..... H01M 2/22 |
| | | | 429/7 |
| 2014/0162136 | A1 * | 6/2014 | Kang ................ H01M 10/0562 |
| | | | 429/319 |
| 2014/0227606 | A1 | 8/2014 | Suzuki et al. |
| 2014/0295286 | A1 | 10/2014 | Badding et al. |
| 2015/0014184 | A1 | 1/2015 | Swonger |
| 2015/0027979 | A1 | 1/2015 | Oukassi et al. |
| 2015/0280276 | A1 * | 10/2015 | Lemke .............. H01M 10/0436 |
| | | | 361/679.55 |
| 2015/0288023 | A1 | 10/2015 | Andry et al. |
| 2015/0311562 | A1 | 10/2015 | Le Van-Jodin et al. |
| 2016/0149203 | A1 | 5/2016 | Martin et al. |
| 2017/0162860 | A1 | 6/2017 | Gaben |
| 2018/0294530 | A1 * | 10/2018 | de Souza .......... H01M 10/0436 |
| 2019/0051930 | A1 * | 2/2019 | de Souza ............. H01M 4/0421 |
| 2019/0157657 | A1 * | 5/2019 | Moitzheim ......... H01M 4/0471 |
| 2019/0221890 | A1 * | 7/2019 | Brew .................. H01M 4/0459 |

OTHER PUBLICATIONS

Ma et al., "A Novel Sol-Gel Method for Large-Scale Production of Nanopowders: Preparation of Li1.5Al0.5Ti1.5(PO4)3 as an Example", Journal of the American Ceramic Society, Approved Sep. 25, 2015, pp. 410-414, vol. 99, No. 2.

Liu et al., "Facile Synthesis of Nanosized Lithium-Ion-Conducting Solid Electrolyte Li1. 4Al0. 4Ti1. 6 (PO4) 3 and Its Mechanical Nanocomposites with LiMn2O4 for Enhanced Cyclic Performance in Lithium Ion Batteries", ACS Applied Materials & Interfaces, Published Mar. 3, 2017, pp. 11696-11703, vol. 9, No. 13.

Bucharsky et al., "Preparation and characterization of sol-gel derived high lithium ion conductive NZP-type ceramics Li 1+ x Al x Ti 2-x (PO 4) 3", Solid State Ionics, Accepted Mar. 7, 2015, pp. 77-82, vol. 274.

* cited by examiner

$Li_{1+x}Al_xTi_{2-x}(PO_4)_3$ SOLID-STATE THIN FILM ELECTROLYTE FOR 3D MICROBATTERY AND METHOD OF FABRICATION

BACKGROUND

The present application relates to solid-state rechargeable battery technology. More particularly, the present application relates to a Li-based solid-state thin film electrolyte that can be used as a component of a solid-state rechargeable three dimensional (3D) microbattery.

In recent years, there has been an increased demand for portable electronic devices such as, for example, computers, mobile phones, tracking systems, scanners, medical devices, smart watches, and fitness devices. One drawback with portable electronic devices is the need to include a power supply within the device itself. Typically, a battery is used as the power supply of such portable electronic devices. Batteries must have sufficient capacity to power the portable electronic device for at least the length that the device is being used. Sufficient battery capacity can result in a power supply that is quite heavy and/or large compared to the rest of the portable electronic device. As such, smaller sized and lighter weight power supplies with sufficient energy storage are desired. Such power supplies can be implemented in smaller and lighter weight portable electronic devices.

Another drawback of conventional batteries is that some of the batteries contain flammable and potentially toxic materials that may leak and may be subject to governmental regulations. As such, it is desired to provide an electrical power supply that is safe, solid-state and rechargeable over many charge/discharge life cycles; a rechargeable battery is a type of electrical battery which can be charged, discharged into a load, and recharged many times, while a non-rechargeable (or so-called primary battery) is supplied fully charged, and discarded once discharged.

One type of an energy-storage device that is small and light weight, contains non-toxic materials and that can be recharged over many charge/discharge cycles is a solid-state, lithium-based battery. Lithium-based batteries are rechargeable batteries that include two electrodes implementing lithium. In conventional lithium-based rechargeable batteries, bulk or thin-film lithium phosphorus oxynitride (LiPON) is typically used as the solid-state electrolyte. One problem associated with prior art thin-film lithium phosphorus oxynitride (LiPON) is that such a material exhibits a low ionic conductivity. For example, the ionic conductivity of a thin-film composed of LiPON is typically from $10^{-5}$ to $10^{-6}$ S/cm, wherein S is Siemens. There is a need for providing a solid-state rechargeable battery that has contains a Li-based solid-state thin-film electrolyte that has a higher ionic conductivity than prior art LiPON.

SUMMARY

A solid-state rechargeable 3D microbattery battery is provided that has improved power density, energy density, and cycle lifetimes. The term "microbattery" denotes a battery having at least one dimension in the micrometer scale. These improvements are afforded by providing a solid-state electrolyte that is composed of crystalline $Li_{1+x}Al_xTi_{2-x}(PO_4)_3$, wherein x is from 0 to 2. The solid-state electrolyte that is composed of crystalline $Li_{1+x}Al_xTi_{2-x}(PO_4)$ has a high ionic conductivity (which is greater than $10^{-4}$ Siemens/cm) as well as a high chemical stability.

One aspect of the present application relates to a solid-state rechargeable 3D microbattery. In one embodiment, the solid-state rechargeable 3D microbattery includes an anode current collector located on a semiconductor substrate. An anode region is located on the anode current collector. A solid-state electrolyte composed of crystalline $Li_{1+x}Al_xTi_{2-x}(PO_4)_3$, wherein x is from 0 to 2, is located on the anode region. A cathode is located on the solid-state electrolyte, and a cathode current collector is located on the cathode.

Another aspect of the present application relates to a solid-state electrolyte. In one embodiment, the solid-state electrolyte includes a layer of crystalline $Li_{1-x}Al_xTi_{2-x}(PO_4)_3$, wherein x is from 0 to 2.

A yet further aspect of the present application relates to a 3-dimensional chip stack comprising a microprocessor, a memory, a sensor, a communicator unit and a solid-state rechargeable 3D microbattery of the present application integrated therein. The solid-state rechargeable 3D microbattery is connected with the 3D chip stack via a silicon interposer and through-silicon-vias (TSVs).

An even further aspect of the present application relates to a method of forming a solid-state electrolyte. In one embodiment, the method includes providing a first admixture of a basic environment, a lithium source solution, and an aluminum source solution. Next, a titanium source solution and a phosphorus source solution are added, in any order, to the first admixture to provide a second admixture. Solvent is then removed from the second admixture to provide a powder of $Li_{1+x}Al_xTi_{2-x}(PO_4)_3$, wherein x is from 0 to 2. Pellets of $Li_{1+x}Al_xTi_{2-x}(PO_4)_3$ are then formed from the powder. Next, a layer of crystalline $Li_{1+x}Al_xTi_{2-x}(PO_4)_3$ is sputtered using the pellets as a solid-electrolyte source.

DETAILED DESCRIPTION

Figure 1:
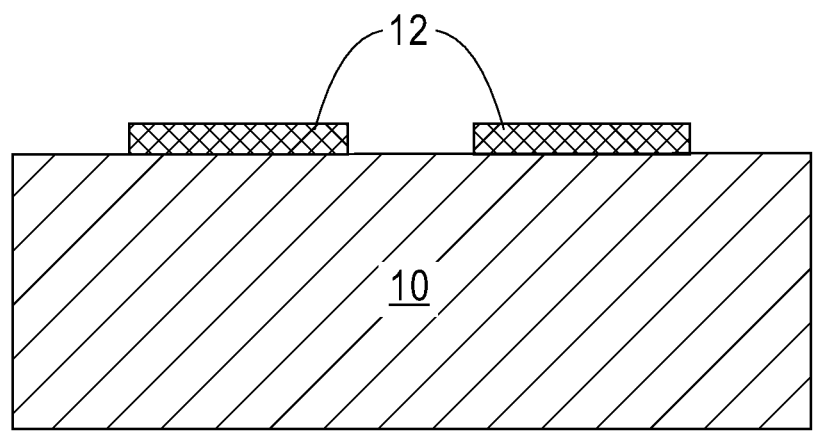
FIG. 1 is a cross sectional view of an exemplary structure that can be used in providing a solid-state rechargeable three dimensional (3D) microbattery of the present application, in which a plurality of metallic islands are formed on a surface of a semiconductor substrate.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

Referring first to FIG. 1, there is illustrated an exemplary structure that can be used in providing a solid-state rechargeable three dimensional (3D) microbattery of the present application. As is shown, the exemplary structure includes a plurality of metallic islands 12 formed on a surface of a semiconductor substrate 10. The semiconductor substrate 10 is composed of at least one semiconductor material.

The term "semiconductor material" is used throughout the present application to denote a material having semiconducting properties. Examples of semiconductor materials that may be employed as the semiconductor substrate 10 include silicon (Si), germanium (Ge), silicon germanium alloys (SiGe), silicon carbide (SiC), silicon germanium carbide (SiGeC), III-V compound semiconductors or II-VI compound semiconductors. III-V compound semiconductors are materials that include at least one element from Group III of the Periodic Table of Elements and at least one element from Group V of the Periodic Table of Elements. II-VI compound semiconductors are materials that include at least one element from Group II of the Periodic Table of Elements and at least one element from Group VI of the Periodic Table of Elements.

In one embodiment, the semiconductor material that may provide the semiconductor substrate 10 is a bulk semiconductor substrate. By "bulk" it is meant that the semiconductor substrate 10 is entirely composed of at least one semiconductor material, as defined above. In one example, the semiconductor substrate 10 may be entirely composed of silicon. In some embodiments, the bulk semiconductor substrate may include a multilayered semiconductor material stack including at least two different semiconductor materials, as defined above. In one example, the multilayered semiconductor material stack may comprise, in any order, a stack of Si and a silicon germanium alloy.

In another embodiment, semiconductor substrate 10 is composed of a topmost semiconductor material layer of a semiconductor-on-insulator (SOI) substrate. The SOI substrate would also include a handle substrate (not shown) including one of the above mentioned semiconductor materials, and an insulator layer (not shown) such as a buried oxide below the topmost semiconductor material layer.

In yet another embodiment, the semiconductor structure 10 is composed of a topmost semiconductor material layer and an insulator layer (not shown), such as, for example, silicon dioxide.

In any of the embodiments mentioned above, the semiconductor material that may provide the semiconductor substrate 10 may be a single crystalline semiconductor material. The semiconductor material that may provide the semiconductor substrate 10 may have any of the well known crystal orientations. For example, the crystal orientation of the semiconductor material that may provide semiconductor substrate 10 may be {100}, {110}, {111}. Other crystallographic orientations besides those specifically mentioned can also be used in the present application.

The semiconductor substrate 10 that can be used in the present application can have a thickness from 10 μm to 5 mm. Other thicknesses that are lesser than, or greater than, the aforementioned thickness values may also be used for semiconductor substrate 10.

The semiconductor substrate 10 that can be employed in the present application has a non-textured (flat or planar) surface. The term "non-textured surface" denotes a surface that is smooth and has a surface roughness on the order of less than 100 nm root mean square as measured by profilometry or atomic force microscopy (AFM). The semiconductor substrate 10 that is employed in the present application is non-patterned at this point of the present application.

After providing the semiconductor substrate 10, metallic islands 12 are formed. The metallic islands 12 that are formed are spaced apart from each other. In one embodiment, the metallic islands 12 are composed of a noble metal or noble metal alloy such as, for example, gold (Au), silver (Ag), platinum (Pt) or alloys thereof. The noble metal or noble metal alloy that provides each metallic island 12 serves as a catalyst during a subsequently performed metal-assisted chemical etching process. Notably, and during a subsequently performed metal-assisted chemical etching process each metallic islands 12 induces local etching of the semiconductor substrate 10 in areas in which the metallic islands 12 directly contact the semiconductor substrate 10.

In some embodiments, the metallic islands 12 may be formed utilizing lithographic patterning techniques such as optical lithography, or electron beam (e-beam) lithography. E-beam lithography can be used to first pattern poly(Methyl MethAcrylate) (PMMA) nanodots on semiconductor substrate 10. Evaporation is then used to deposit a thin film of a noble metal or metal alloy atop of the PMMA and the semiconductor substrate 10. A lift off process is then performed to remove the PMMA in order to fabricate the metallic islands 12.

The shape of each metallic island 12 that is formed may vary and can be predetermined prior to fabrication thereof. In one embodiment and as shown, each metallic island 12 is rectangular in shape. In another embodiment, each metallic island 12 has a semispherical (i.e., domed) shape. In yet another embodiment, each metallic island 12 has a pyramidal shape. Other shapes are possible for each metallic island 12.

Figure 2A:
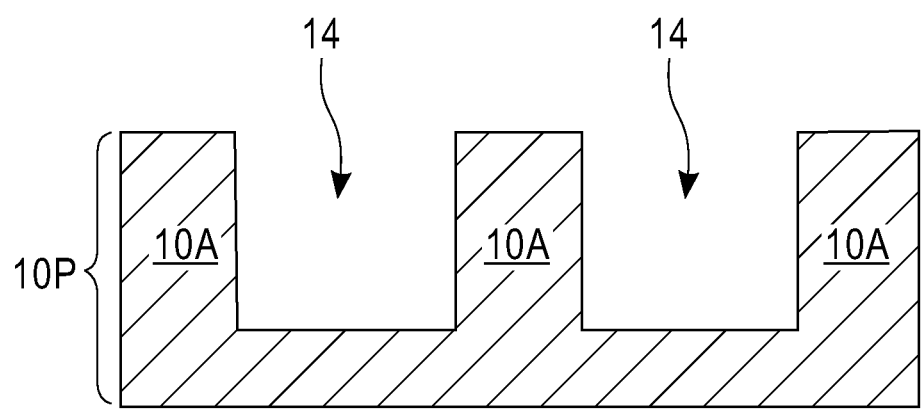
FIG. 2A is a cross sectional view of the exemplary structure of FIG. 1 after patterning the semiconductor substrate utilizing metal-assisted chemical etching.

Referring now to FIG. 2A, there is illustrated the exemplary structure of FIG. 1 after patterning the substrate 10 to provide a patterned substrate 10P. In one embodiment of the present application, patterning of substrate 10 can be performed by utilizing a metal-assisted chemical etching process.

The metal-assisted chemical etching process uses the metallic islands 12 to induce local oxidation and reduction reactions under open circuit. That is, the metallic islands 12 serves as a local cathode to catalyze the reduction of oxidants (e.g., hydrogen peroxide, $H_2O_2$) producing holes (h+). The holes (h+) are then injected into the valence band of the semiconductor substrate 10 to oxidize and form the ionic form that is soluble in an acidic solution (e.g., hydrogen fluoride, HF). This results in the removal of semiconductor materials without net consumption of the metallic islands 12. Under controlled etching conditions, the metal-assisted chemical etching process reactions occur only at the interface between metallic islands 12 and the semiconductor substrate 10. As a result, the noble metal or metal alloy descends into the semiconductor material as the semiconductor substrate 10 is being etched right underneath, acting as a negative resist etch mask. The metal-assisted chemical etching process transfers the pattern of the metallic islands 12 into the semiconductor substrate 10 to produce the patterned semiconductor substrates 10P.

Figure 2B:
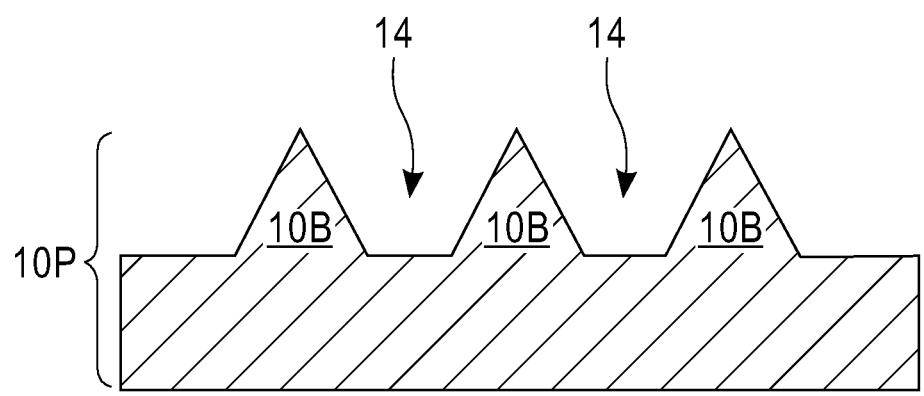
FIGS. 2B, 2C and 2D are cross sectional views of other patterned semiconductor substrates that can be used in the present application.
Figure 2C:
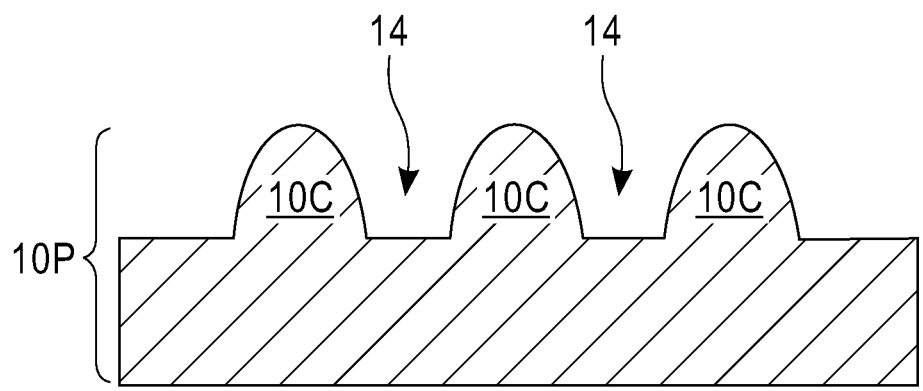
Figure 2D:
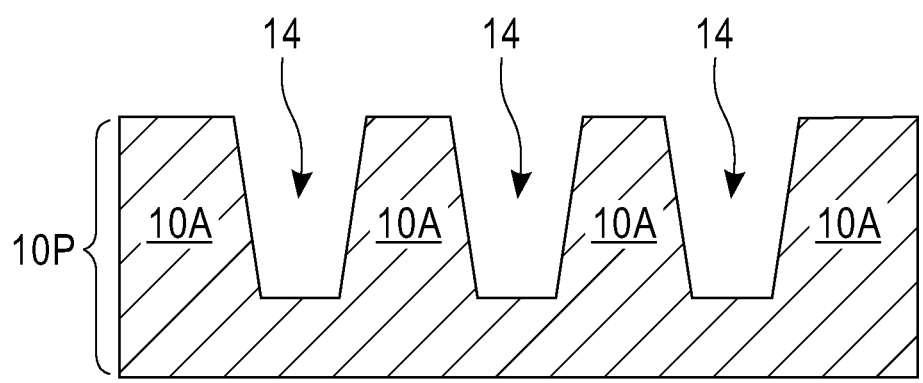

In the embodiment illustrated in FIG. 2A, the patterned substrate 10P has a plurality of pillar portions 10A, that are separated by gap 14 that has vertically sidewalls. In such an embodiment, each gap 14 may have an aspect ratio of from 0.1:100 to 1:10. Other patterned semiconductor substrates 10P can also be formed. FIGS. 2B, 2C and 2D illustrate other patterned semiconductor substrates 10P that can be used in the present application and formed utilizing the metal-assisted chemical etching process mentioned above. Notably, FIG. 2B shows an exemplary patterned semiconductor substrate 10P having a plurality of pyramids 10B that are spaced apart by gap 14. FIG. 2C shows an exemplary patterned semiconductor substrate 10P having a plurality of cones 10C that are spaced apart by a gap 14, and FIG. 2D shows an exemplary patterned semiconductor substrate 10P having a plurality of pillar portions 10A that are separated by gap 14 that has non-vertically sidewalls.

In some embodiments of the present application, the patterning of the semiconductor substrate 10 may include providing a plurality of metallic islands 12 on the surface of semiconductor substrate 10. In this embodiment, the metallic islands 12 are composed of any metal or metal alloy that has a different etch rate than the semiconductor material that provides the semiconductor substrate 10. The metallic islands 12 can be formed by deposition and lithography. Next, patterning of the substrate 10 is performed utilizing each metallic islands 12 as an etch mask. Patterning may be performed by etching the exposed portions of the substrate 10 not containing the metallic islands 12. After the substrate 10 is patterned, the metallic islands 12 may be removed by utilizing a material removal process that is selective in removing the metallic islands 12 from the patterned semiconductor substrate 10.

Figure 3:
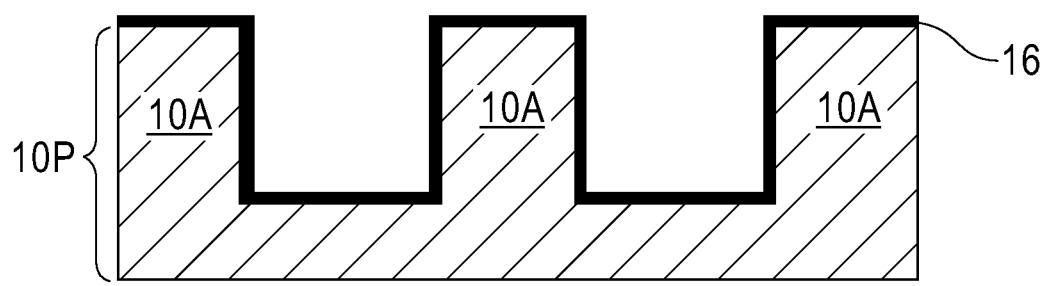
FIG. 3 is a cross sectional view of the exemplary structure of FIG. 2A after forming an anode current collector on the patterned semiconductor substrate.

Referring now to FIG. 3, there is illustrated the exemplary structure of FIG. 2A after forming an anode current collector 16 on the patterned semiconductor substrate 10P. The anode current collector 16 is formed continuously on the physically exposed topmost surface of the patterned semiconductor substrate 10P and along the sidewalls and bottom wall of each gap 14; the gaps 14 are not entirely filled with the anode current collector 16.

Although the present application describes and illustrates that the anode current collector 16 is formed on the patterned semiconductor substrate 10P illustrated in FIG. 2A, the anode current collector 16 may be formed on any of the other patterned semiconductor substrates 10P that can be formed utilizing the methods mentioned above. Thus, for example, the anode current collector 16 may be formed on the patterned semiconductor substrate 10P shown in FIG. 2B, or FIG. 2C or FIG. 2D.

The anode current collector 16 (anode-side electrode) may include any metallic electrode material such as, for example, titanium (Ti), platinum (Pt), nickel (Ni), copper (Cu) or titanium nitride (TiN). In one example, the anode current collector 16 includes a stack of, from bottom to top, nickel (Ni) and copper (Cu). The anode current collector 16 may be formed utilizing a deposition process such as, for example, chemical vapor deposition (CVD), sputtering or plating. The anode current collector 16 may have a thickness from 10 nm to 100 mm.

Figure 4:
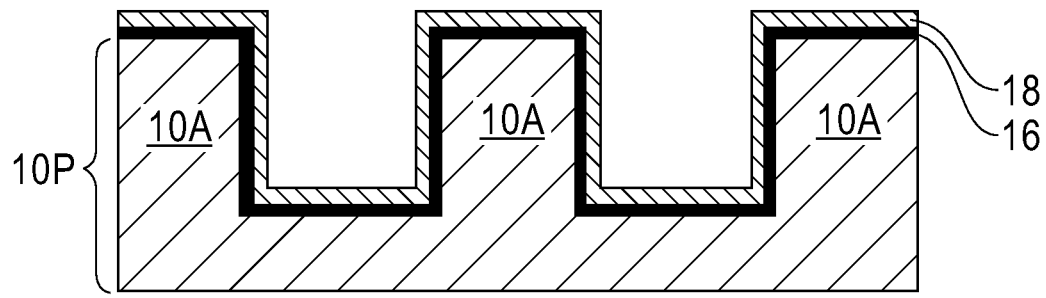
FIG. 4 is a cross sectional view of the exemplary structure of FIG. 3 after forming an anode region on the anode current collector.

Referring now to FIG. 4, the illustrated the exemplary structure of FIG. 3 after forming an anode region 18 on the anode current collector 16. The anode region 18 may include any conventional anode material that is found in a rechargeable battery. In some embodiments, the anode region 18 is composed of a lithium metal, a lithium-base alloy such as, for example, $Li_xSi$, or a lithium-based mixed oxide such as, for example, lithium titanium oxide ($Li_2TiO_3$). The anode region 18 may also be composed of Si, graphite, or amorphous carbon.

In some embodiments, the anode region 18 is formed prior to performing a charging/recharging process. In such an embodiment, the anode region 18 can be formed utilizing a deposition process such as, for example, chemical vapor deposition (CVD), plasma enhanced chemical vapor deposition (PECVD), evaporation, sputtering or plating. In some embodiments, the anode region 18 is a lithium accumulation region that is formed during a subsequently performed charging/recharging process which is performed after the formation of the solid-state rechargeable 3D microbattery. The lithium accumulation region can be a continuous region or a discontinuous region. The anode region 18 may have a thickness from 10 nm to 100 nm. The anode region 18 does not completely fill in each gap 14.

Figure 5:
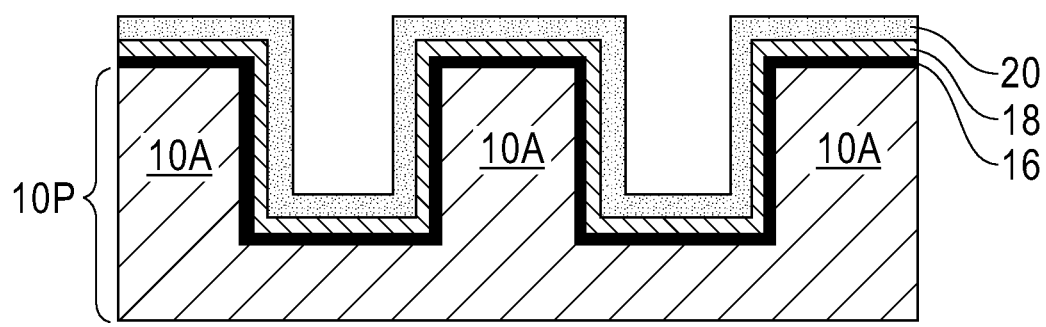
FIG. 5 is a cross sectional view of the exemplary structure of FIG. 4 after forming a solid-state electrolyte composed of crystalline $Li_{1+x}Al_xTi_{2-x}(PO_4)_3$, wherein x is from 0 to 2.

Referring now to FIG. 5, there is illustrated the exemplary structure of FIG. 4 after forming a solid-state electrolyte 20. In some embodiments, the solid-state electrolyte 20 is formed directly upon the anode region 18. In other embodiments, the solid-state electrolyte 20 is formed directly upon the anode current collector 16. The solid-state electrolyte 20 does not completely fill in each gap 14.

The solid-state electrolyte 20 that is employed in the present application is composed of crystalline $Li_{1+x}Al_xTi_{2-x}(PO_4)_3$, wherein x is from 0 to 2. In some embodiments, x is from 0.1 to 0.7. Examples of solid-state electrolytes 20 that can be employed in the present application include, but are not limited to, $Li_{1.5}Al_{0.5}Ti_{1.5}(PO_4)_3$, $Li_{1.4}Al_{0.4}Ti_{1.6}(PO_4)_3$, $Li_{1.3}Al_{0.3}Ti_{1.7}(PO_4)_3$, $Li_{1.2}Al_{0.2}Ti_{1.8}(PO_4)_3$ or $Li_{1.1}Al_{0.1}Ti_{1.9}(PO_4)_3$.

The solid-state electrolyte 20 has an improved ionic conductivity (which is less than $10^{-4}$ Siemens/cm) and chemical stability as compared to conventional solid-state Li-based electrolytes. In one example, the ionic conductivity of the solid-state electrolyte 20 of the present application is about $10^{-3}$ Siemens/cm.

The solid-state electrolyte 20 of the present application is prepared by first providing a powder that is composed $Li_{1+x}Al_xTi_{2-x}(PO_4)_3$. The powder is prepared utilizing a sol-gel method in which a first admixture of a basic environment, a lithium source solution, and an aluminum source solution is provided.

The basic environment that can be used in the present application can be prepared by dissolving an alkaline material in a solvent. Examples of alkaline materials that can be used in the present application include, but are not limited to, $NH_4HCO_3$, $(NH_4)_2CO_3$, $Na_2CO_3$ or $NH_4OH$. The solvent that can be used includes, but is not limited to, water or alcohols such as, for example, isopropanol or n-butanol. The basic environment may be formed by dissolving from 2 grams to 20 grams of alkaline material per 100 ml of solvent.

The lithium source solution that can be used in the present application may include a lithium (Li) source material and water. Examples of Li source materials that can be employed in the present application include, but are not limited to, Li acetate, LiCl, $LiHCO_3$, $Li_2CO_3$, $Li_2C_2O_4$, LiOH or $LiNO_3$. The lithium source solution may be formed by dissolving from 0.1 grams to 5 grams of lithium source material per 100 ml of water.

The aluminum source solution that can be used in the present application may include an aluminum (Al) source material and water. Examples of Al source materials that can be employed in the present application include, but are not limited to, $AlCl_3$, $Al(NO_3)\cdot 9H_2O$, $Al(C_2H_3O_2)_3$, $Al_2(CO_3)_3$, or $Al_2(C_2O_4)_3$. The aluminum source solution may be formed by dissolving from 0.1 grams to 5 grams of aluminum source material per 100 ml of water.

In one embodiment of the present application, the lithium source solution and the aluminum source solution can be added separately in any order to the basic environment. In another embodiment, the lithium source solution and the aluminum source solution can combined together and then added together to the basic environment. In either embodiment, the addition is performed in a drop-wise manner with vigorous stirring.

A phosphorus source solution and a titanium source solution are then added to the admixture of the lithium source solution, the aluminum source solution and the basic environment. In one embodiment of the present application, the phosphorus source solution and a titanium source solution can be added separately, and in any order, to the admixture containing the lithium source solution, the aluminum source solution and the basic environment. In one example, the phosphorus source solution is added prior to the titanium source solution. In another example, the titanium source solution is added prior to the phosphorus source solution. In yet another embodiment, the phosphorus source solution and the titanium source solution can be added concurrently to the admixture containing the lithium source solution, the aluminum source solution and the basic environment.

In any of the above mentioned embodiments, the addition of the phosphorus source solution and the titanium source solution is performed in a drop-wise manner with vigorous stirring. The stirring may be performed for various lengths of time. In one example, stirring is performed from 30 minutes to 1.5 hours. The addition of the phosphorus source solution and the titanium source solution and subsequent stirring is performed at room temperature (18° C. to 20° C.).

The phosphorus source solution that can be used in the present application may include a phosphorus (P) source material and water. Examples of P source materials that can be employed in the present application include, but are not limited to, $NH_4H_2PO_4$, $(NH_4)_2HPO_4$, $(NH_4)_3PO_4$, $LiPO_4$, $Li_2HPO_4$ or $LiH_2PO_4$. The phosphorus source solution may be formed by dissolving from 2 grams to 20 grams of phosphorus source material per 100 ml of water.

The titanium source solution that can be used in the present application may include a titanium (Ti) source material and water. Examples of Ti source materials that can be employed in the present application include, but are not limited to, $Ti(OC_3H_7)_4$, $Ti(OC_4H_9)_4$ or $TiCl_4$. The titanium source solution may be formed by dissolving from 2 grams to 20 grams of titanium source material per 100 ml of water.

The second admixture which includes the lithium source solution, the aluminum source solution, the basic environment, the phosphorus source solution and the titanium source solution is vigorously stirred for various lengths of time. In one example, stirring is performed for 30 minutes to 1.5 hours. The second admixture may be referred to a precursor powder solution.

The second admixture (i.e., the precursor powder solution) is then dried at a temperature that is sufficient to remove any liquid therefrom and to provide a precursor powder. The drying may be performed at a temperature that is greater than 100° C. In one embodiment, the drying is performed at a temperature from 115° C. to 125° C. The drying may be performed under vacuum, or in an inert ambient.

The precursor powder is then calcined to provide a powder composed of $Li_{1+x}Al_xTi_{2-x}(PO_4)_3$. Calcination comprises heating the precursor powder to a temperature of from 800° C. or greater. In some embodiments, the calcination temperature is from 825° C. or greater, from 875° C. or greater, from 900° C. or greater, from 925° C. or greater, from 950° C. or greater, from 975° C. or greater, from 1000° C. or greater, from 1025° C. or greater, or from 1250° C. or greater. In one embodiment, the calcination is conducted in air and at ambient pressure.

The powder composed of $Li_{1+x}Al_xTi_{2-x}(PO_4)_3$ is then grounded by ball milling and thereafter subjected to a pelletization process. The pelletization process may include utilizing an isostactic press. In such an embodiment, a force from 5 MPA to 20 MPA may be used to provide pellets composed of $Li_{1+x}Al_xTi_{2-x}(PO_4)_3$. The pellets that are formed are typically spherical and have a radial particle size from 1 nm to 50 mm.

The pellets of $Li_{1+x}Al_xTi_{2-x}(PO_4)_3$ are then sintered at a temperature that is from 1200° C. to 1600° C. Sintering may be performed in air. The sintered pellets of $Li_{1+x}Al_xTi_{2-x}(PO_4)_3$ are then used as a source to provide the solid-state electrolyte 20 that is composed of crystalline $Li_{1+x}Al_xTi_{2-x}(PO_4)_3$.

Notably, the solid-state electrolyte 20 may be formed utilizing a sputtering process in which the sintered pellets of $Li_{1+x}Al_xTi_{2-x}(PO_4)_3$ are used as the electrolyte source. Sputtering may be performed in an admixture of an inert gas. Examples of inert gases that may be used include argon, helium, neon, nitrogen or any combination thereof.

The solid-state electrolyte 20 may have a thickness from 100 nm to 2000 nm. Other thicknesses that are lesser than, or greater than, the aforementioned thickness values may also be used for the solid-state electrolyte 20.

Figure 6:
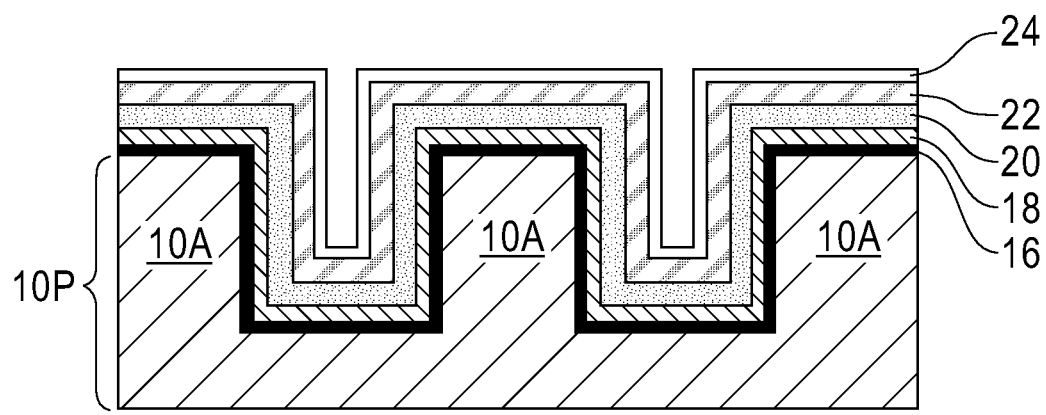
FIG. 6 is a cross sectional view of the exemplary structure of FIG. 5 after forming a cathode and a cathode current collector above the solid-state electrolyte.

Referring now to FIG. 6, there is illustrated the exemplary structure of FIG. 5 after forming a cathode 22 and a cathode current collector 24 above the solid-state electrolyte 20. The cathode 22 and the cathode current collector 24 do not fill in each gap 14.

The cathode 22 that is formed may include any cathode material that is typically employed in a solid-state rechargeable 3D microbattery. In one embodiment, the cathode material that provides the cathode 22 is a lithiated material such as, for example, a lithium-based mixed oxide. Examples of lithium-based mixed oxides that may be employed as include, but are not limited to, lithium cobalt oxide ($LiCoO_2$), lithium nickel oxide ($LiNiO_2$), lithium manganese oxide ($LiMn_2O_4$), lithium cobalt manganese oxide ($LiCoMnO_4$), a lithium nickel manganese cobalt oxide ($LiNi_xMn_yCo_zO_2$), lithium vanadium pentoxide ($LiV_2O_5$) or lithium iron phosphate ($LiFePO_4$).

The cathode material that provides the cathode 22 may be formed utilizing a sputtering process. In one embodiment, sputtering may include the use of any precursor source material or combination of precursor source materials. In one example, a lithium precursor source material and a cobalt precursor source material are employed in forming a lithium cobalt mixed oxide. Sputtering may be performed in an admixture of an inert gas and oxygen. In such an embodiment, the oxygen content of the inert gas/oxygen admixture can be from 0.1 atomic percent to 70 atomic percent, the remainder of the admixture includes the inert gas. Examples of inert gases that may be used include argon, helium, neon, nitrogen or any combination thereof.

The cathode 22 may have a thickness from 100 nm to 2000 nm. Other thicknesses that are lesser than, or greater than, the aforementioned thickness values may also be used for the cathode 22. Thick cathodes 22 can provide enhanced battery capacity since there is more area, i.e., volume, to store the battery charge.

The cathode current collector 24 may include any metallic electrode material such as, for example, titanium (Ti), platinum (Pt), nickel (Ni), copper (Cu) and titanium nitride (TiN). In one example, cathode current collector 24 includes a stack of, from bottom to top, titanium (Ti), platinum (Pt) and titanium (Ti). The cathode current collector electrode 24 may be formed utilizing a deposition process including, for example, chemical vapor deposition (CVD), plasma enhanced chemical vapor deposition (PECVD), evaporation, sputtering, or plating. The cathode current collector electrode 24 may have a thickness from 5 nm to 20 nm. Other thicknesses that are lesser than, or greater than, the aforementioned thickness values may also be used for the cathode current collector 24.

Figure 7:
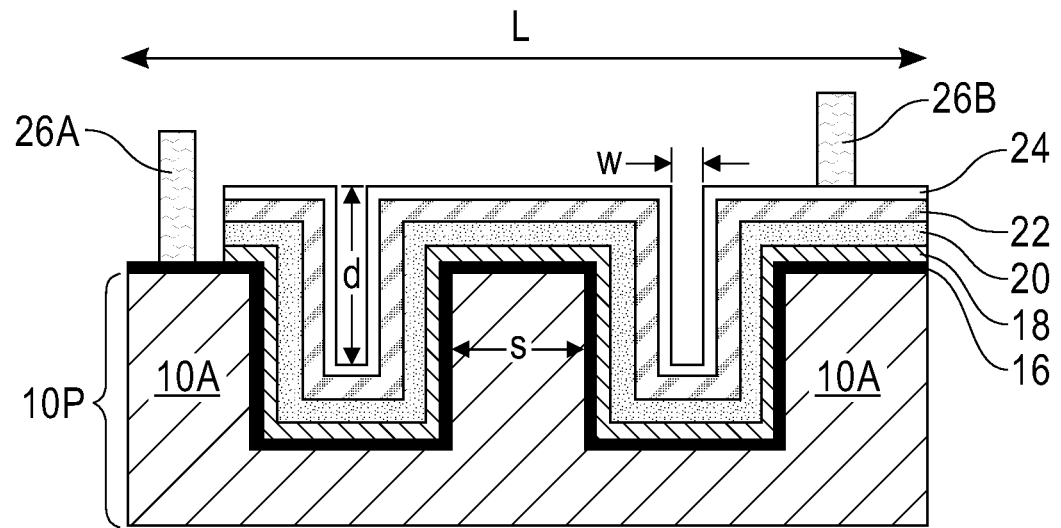
FIG. 7 is a cross sectional view of the exemplary structure of FIG. 6 after contact formation; the exemplary structure of FIG. 7 illustrates a solid-state rechargeable 3D microbattery of the present application.

Referring now to FIG. 7, there is illustrated the exemplary structure of FIG. 6 after contact formation. The exemplary structure of FIG. 7 illustrates a solid-state rechargeable 3-D microbattery of the present application. Notably, a first contact 26A is formed that contacts a surface of the anode current collector 16, and a second contact 26B is formed that contacts a surface of the cathode current collector 24. The first and second contacts 26A, 26B are spaced apart by a length, L.

In addition to length, FIG. 7 also identifies other feature sizes of the solid-state rechargeable 3D microbattery of the present application. For example, FIG. 7 illustrates the following feature sizes, d, which is a distance between 10 nm to 10 mm, s, which is a distance between 10 nm to 10 mm, and w, which is a distance between 10 nm to 10 mm. In one embodiment, L may be from 50 μm to 100 μm, d may be from 10 μm to 150 μm, s may be from 2 μm to 5 μm, and w may be from 2 μm to 5 μm. Other dimensions for L, d, s, and w are possible and are not excluded from being used in the present application.

The first and second contacts 26A, 26B can be formed utilizing techniques well known to those skilled in the art. For example, lithography and etching can be used to physically expose a surface of the anode current collector 16 and then a contact metal or metal alloy such as, for example, copper (Cu), and/or aluminum (Al), is formed by deposition so as to provide the first contact 26A that contacts the physically exposed surface of the anode current collector 16. The second contact 26B may be formed by lithography and deposition of a contact metal or metal alloy so as to provide the second contact 26B that contacts the cathode current collector 24. The order of contact formation may vary.

The solid-state rechargeable 3D battery of the present application (with or without the anode region 18) can be subjected to a charge/recharge method. When no anode region 18 is intentionally deposited, the charging forms an anode region 18, i.e., lithium accumulation region (continuous or discontinuous). The charge/recharge method may be performed utilizing conventional charging techniques well known to those skilled in the art. For example, the charge/recharge method may be performed by connecting the solid-state rechargeable battery of the present application to an external power supply and supply current or a voltage to the battery. In such charging/recharging method, a constant current is used until a maximum voltage is reached.

The solid-state rechargeable 3D battery of the present application has improved power density, energy density, and cycle lifetimes due to improved ionic conductivity (which is greater than $10^{-4}$ Siemens/cm) and chemical stability of the solid-state electrolyte 20 described above.

Figure 8:
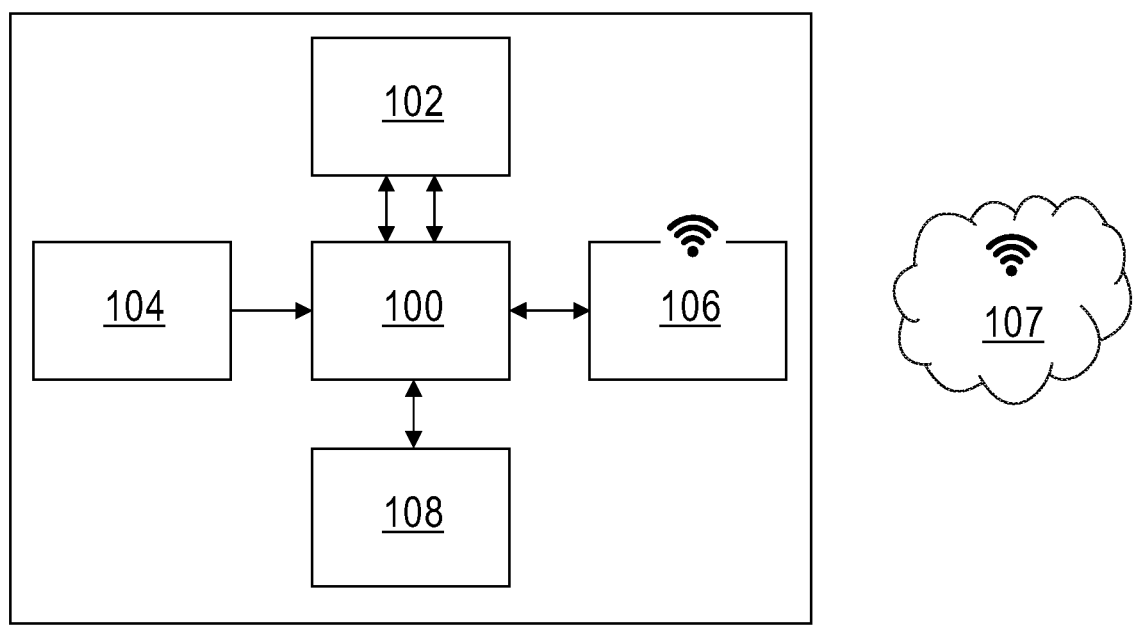
FIG. 8 is a plain view of a 3D chip stack electronic system including a microprocessor, a memory, a sensor, a communicator unit, and a solid-state rechargeable 3D microbattery of the present application integrated therein.
Figure 9:
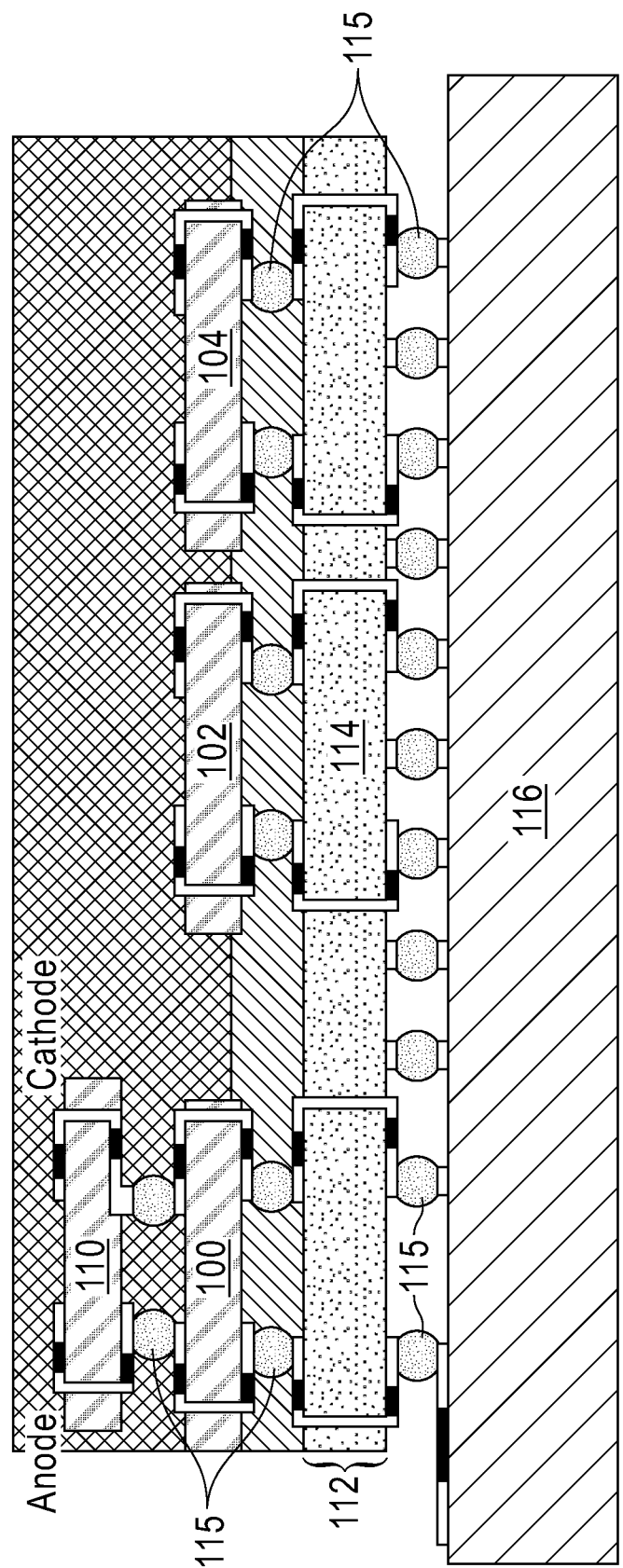
FIG. 9 is a cross sectional view of a 3D chip stack electronic systems comprising of a microprocessor, a memory, a sensor, a communicator unit and a solid-state rechargeable 3D microbattery of the present application integrated therein.

Referring now to FIGS. 8-9, there are illustrated different views of a 3-dimensional chip stack that can be used in the present application. The 3-dimensional chip stack includes a microprocessor 100, a memory 102, a sensor 104, and a communicator unit 106 such as, for example, a wireless telemetry. The 3-dimensional chip stack may also include a computer cloud 107 and an actuator 106. As is shown in FIG. 9, the 3-dimensional chip stack may also include a solid-state rechargeable 3D microbattery 110 of the present application integrated therein. The solid-state rechargeable 3D microbattery 110 is connected with the 3D chip stack via a silicon interposer 114 and through-silicon-vias (TSVs) 112. In FIG. 9, element 115 are solder bumps, and element 116 is a printed circuit board. In accordance with an embodiment, the microbattery 110 of the present application is connected to the microprocessor 100 via the contacts 28A/28B shown in FIG. 7. The 3-dimensional chip stack can be used in IOT (internet of things) applications and can be formed utilizing techniques well known to those skilled in the art.

Figure 10:
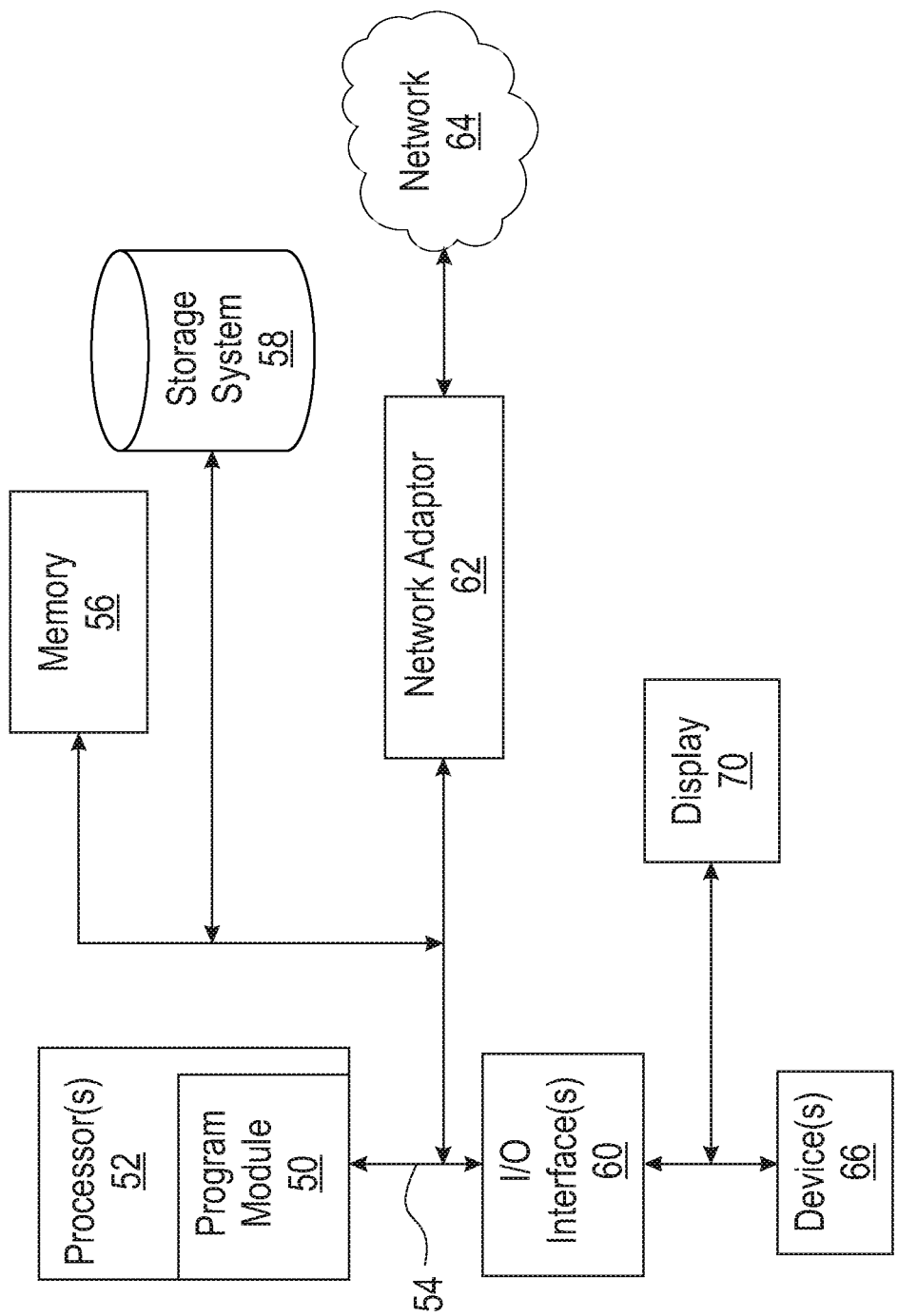
FIG. 10 is an exemplary block diagram of a computer system in which the solid-state rechargeable 3D microbattery of the present application may be used therein as a power supply.

Referring now to FIG. 10, there is illustrated an exemplary block diagram of a computer system (i.e., processor) in which the solid-state rechargeable 3D microbattery of the present application may be used therein as a power supply; the solid-state rechargeable 3D microbattery may be located in the processor 52. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 52, a system memory 56, and a bus 54 that couples various system components including system memory 56 to processor 52. The processor 52 may include a software module 50 that performs various tasks. The module 50 may be programmed into the integrated circuits of the processor 52, or loaded from memory 56, storage device 58, or network 64 or combinations thereof.

Bus 54 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 56 can include computer system readable media in the form of volatile memory, such as random access memory (RAM) and/or cache memory or others. Computer system may further include other removable/non-removable, volatile/non-volatile computer system storage media. By way of example only, storage system 58 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 66 such as a keyboard, a pointing device, a display 70, etc.; one or more devices that enable a user to interact with computer system; and/or any devices (e.g., network card, modem, etc.) that enable computer system to communicate with one or more other computing devices. Such communication can occur via Input/Output (I/O) interfaces 60.

Still yet, computer system can communicate with one or more networks 64 such as a local area network (LAN), a general wide area network (WAN), and/or a public network (e.g., the Internet) via network adapter 62. As depicted, network adapter 62 communicates with the other components of computer system via bus 54. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

EXAMPLES

The following compositions (as shown in Table 1) are provided to illustrate the formation of pellets composed $Li_{1+x}Al_xTi_{2-x}(PO_4)_3$ that can be used as the electrolyte source in forming a solid-state electrolyte of the present application that is composed of crystalline $Li_{1+x}Al_xTi_{2-x}(PO_4)_3$. In these examples, Li acetate (LiAc) was used as the lithium source material, $Al(NO_3)_3 \cdot 9H_2O$ was used as the aluminum source material, $NH_4HCO_3$ was used as the alkaline material, water was used as the solvent, $Ti(OC_3H_7)_4$ was used as the titanium source material, and $NH_4H_2PO_4$ was used as the phosphorus source material.

In these examples, the pellets were formed by dissolving lithium acetate and $Al(NO_3)_3 \cdot 9H_2O$ in deionized water and thereafter adding the solution dropwise into excessive $NH_4HCO_3$ water solution (300 ml) under vigorous stirring utilizing a magnetic stirring bar. $Ti(OC_3H_7)_4$ and $NH_4H_2PO_4$ were then added dropwise into the solution and this second admixture was stirred for 2 hours.

The second admixture was then dried at 120° C. to remove solvent, pyrolyzed at 350° C. for 2 hrs and then calcined at 800° C. for 30 minutes to form a powder. Each powder was then ground by ball milling and then pelletized using an isostatic press at 200 MPa. Sintering may follow the pelletization process.

TABLE 1

| $Li_{1+x}Al_xTi_{2-x}(PO_4)_3$ Composition (in accordance with the present application): | | | | | |
|---|---|---|---|---|---|
| Composition | $NH_4HCO_3$ | $Al(NO_3)_3 \cdot 9H_2O$ | LiAc | $Ti(OC_3H_7)_4$ | $NH_4H_2PO_4$ |
| $Li_{1.5}Al_{0.5}Ti_{1.5}(PO_4)_3$ | 25 grams | 0.02 mol (7.5 grams) | 0.072 mol (7.4 grams) | 0.06 mol (17.76 grams) | 0.12 mol (13.8 grams) |
| $Li_{1.4}Al_{0.4}Ti_{1.6}(PO_4)_3$ | 25 grams | 0.02 mol (7.5 grams) | 0.077 mol (7.86 grams) | 0.08 mol (23.69 grams) | 0.15 mol (17.25 grams) |

TABLE 1-continued

Li$_{1+x}$Al$_x$Ti$_{2-x}$(PO$_4$)$_3$ Composition (in accordance with the present application):

| Composition | NH$_4$HCO$_3$ | Al(NO$_3$)$_3$·9H$_2$O | LiAc | Ti(OC$_3$H$_7$)$_4$ | NH$_4$H$_2$PO$_4$ |
|---|---|---|---|---|---|
| Li$_{1.3}$Al$_{0.3}$Ti$_{1.7}$(PO$_4$)$_3$ | 25 grams | 0.01 mol (3.75 grams) | 0.052 mol (5.31 grams) | 0.0566 mol (16.78 grams) | 0.1 mol (11.5 grams) |
| Li$_{1.2}$Al$_{0.2}$Ti$_{1.8}$(PO$_4$)$_3$ | 25 grams | 0.01 mol (3.75 grams) | 0.072 mol (7.4 grams) | 0.09 mol (26.65 grams) | 0.15 mol (17.25 grams) |
| Li$_{1.1}$Al$_{0.1}$Ti$_{1.9}$(PO$_4$)$_3$ | 25 grams | 0.005 mol (1.88 grams) | 0.066 mol 6.73 grams) | 0.095 mol 28.13 grams) | 0.15 mol 17.25 grams) |

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A solid-state rechargeable 3D microbattery comprising:
an anode current collector located on a semiconductor substrate;
an anode region located on the anode current collector;
a solid-state electrolyte composed of crystalline Li$_{1+x}$Al$_x$Ti$_{2-x}$(PO$_4$)$_3$, wherein x is from 0 to 2, and the layer of crystalline Li$_{1+x}$Al$_x$Ti$_{2-x}$(PO$_4$)$_3$, is selected from the group consisting of Li$_{1.5}$Al$_{0.5}$Ti$_{1.5}$(PO$_4$)$_3$, Li$_{1.4}$Al$_{0.4}$Ti$_{1.6}$(PO$_4$), Li$_{1.3}$Al$_{0.3}$Ti$_{1.7}$(PO$_4$)$_3$ and Li$_{1.1}$Al$_{0.1}$Ti$_{1.9}$(PO$_4$)$_3$ and located on the anode region;
a cathode located on the solid-state electrolyte; and
a cathode current collector located on the cathode.

2. The solid-state rechargeable 3D microbattery of claim 1, wherein the semiconductor substrate is a patterned substrate containing a plurality of semiconductor material pillars.

3. The solid-state rechargeable 3D microbattery of claim 1, wherein the semiconductor substrate is a patterned substrate containing a plurality of semiconductor material pyramids.

4. The solid-state rechargeable 3D microbattery of claim 1, wherein the semiconductor substrate is a patterned substrate containing a plurality of semiconductor material cones.

5. The solid-state rechargeable 3D microbattery of claim 1, wherein the cathode comprises a lithiated cathode material.

6. The solid-state rechargeable 3D microbattery of claim 1, wherein the layer of crystalline Li$_{1+x}$Al$_x$Ti$_{2-x}$(PO$_4$)$_3$, has an ionic conductivity of greater than $10^{-4}$.

7. The solid-state rechargeable 3D microbattery of claim 1, wherein the anode region is present continuously between the anode current collector and the solid-state electrolyte.

8. The solid-state rechargeable 3D microbattery of claim 1, wherein the anode region is present discontinuously between the anode current collector and the solid-state electrolyte.

9. The solid-state rechargeable 3D microbattery of claim 1, further comprising a first contact contacting a surface of the anode current collector and a second contact contacting a surface of the cathode current collector and spaced apart from the first contact.

10. A solid-state electrolyte comprising a layer of crystalline Li$_{1+x}$Al$_x$Ti$_{2-x}$(PO$_4$)$_3$, wherein x is from 0 to 2, and the layer of crystalline Li$_{1+x}$Al$_x$Ti$_{2-x}$(PO$_4$)$_3$, is selected from the group consisting of Li$_{1.5}$Al$_{0.5}$Ti$_{1.5}$(PO$_4$)$_3$, Li$_{1.4}$Al$_{0.4}$Ti$_{1.6}$(PO$_4$)$_3$ Li$_{1.3}$Al$_{0.3}$Ti$_{1.7}$(PO$_4$)$_3$, and Li$_{1.1}$Al$_{0.1}$Ti$_{1.9}$(PO$_4$)$_3$.

11. The solid-state electrolyte of claim 10, wherein the layer of crystalline Li$_{1+x}$Al$_x$Ti$_{2-x}$(PO$_4$)$_3$ has an ionic conductivity of greater than $10^{-4}$.

* * * * *